(12) United States Patent
Mansouri Rad et al.

(10) Patent No.: US 11,374,675 B2
(45) Date of Patent: Jun. 28, 2022

(54) METHOD AND APPARATUS FOR MODIFYING CHANNELS IN AN OPTICAL MEDIUM

(71) Applicant: Huawei Technologies Co., Ltd., Guangdong (CN)

(72) Inventors: Mohammad Mehdi Mansouri Rad, Kanata (CA); Hamid Mehrvar, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 539 days.

(21) Appl. No.: 15/635,428

(22) Filed: Jun. 28, 2017

(65) Prior Publication Data
US 2019/0007156 A1    Jan. 3, 2019

(51) Int. Cl.
*H04B 10/296* (2013.01)
*H04J 14/02* (2006.01)

(52) U.S. Cl.
CPC ........ *H04J 14/0256* (2013.01); *H04B 10/296* (2013.01); *H04J 14/021* (2013.01); *H04J 14/0221* (2013.01)

(58) Field of Classification Search
None
See application file for complete search history.

(56) References Cited

U.S. PATENT DOCUMENTS

| | | | | |
|---|---|---|---|---|
| 6,031,647 A * | 2/2000 | Roberts | ............... | H04B 10/503 398/197 |
| 6,425,817 B1 * | 7/2002 | Momemy | ............... | G07D 9/06 453/17 |
| 2003/0113117 A1 * | 6/2003 | Taneda | ............ | H04B 10/25133 398/79 |
| 2004/0208577 A1 * | 10/2004 | Cahill | ................. | H04B 10/296 398/83 |
| 2005/0024715 A1 * | 2/2005 | Inoue | ................. | H04J 14/0221 359/337 |
| 2005/0180751 A1 | 8/2005 | Wood et al. | | |
| 2006/0024057 A1 * | 2/2006 | Kilper | ................. | H04B 10/296 398/69 |

(Continued)

FOREIGN PATENT DOCUMENTS

| | | |
|---|---|---|
| CN | 1647433 A | 7/2005 |
| CN | 102113246 A | 6/2011 |

(Continued)

OTHER PUBLICATIONS

Shen et al: "From Coarse Grid to MiniOGrid to Gridless: How Much can Gridless Help Contentionless?", OFC 2011, Mar. 6-10, 2011, paper # OTul3.pdf, 3 pages.*

(Continued)

*Primary Examiner* — Li Liu
(74) *Attorney, Agent, or Firm* — Slater Matsil, LLP

(57) ABSTRACT

In some examples, an optical node includes transition logic to: receive an indication of a data channel to be added across an optical medium, the data channel to occupy a portion of an optical spectrum; in response to a receipt of the indication, divide the data channel into a plurality of sub-channels; and sequentially add each of the plurality of sub-channels across the optical medium in a particular order.

3 Claims, 14 Drawing Sheets

(56) References Cited

U.S. PATENT DOCUMENTS

| | | | |
|---|---|---|---|
| 2006/0263089 A1* | 11/2006 | Furst | H04B 10/296 398/79 |
| 2008/0310858 A1* | 12/2008 | Lu | H04B 10/296 398/158 |
| 2010/0129076 A1 | 5/2010 | Barbarossa | |
| 2011/0176802 A1 | 7/2011 | Callan | |
| 2013/0136021 A1 | 5/2013 | Pankaj et al. | |
| 2013/0191877 A1 | 7/2013 | Rakib | |
| 2013/0336658 A1* | 12/2013 | Xia | H04J 14/0204 398/83 |
| 2014/0112660 A1* | 4/2014 | Al Sayeed | H04J 14/0221 398/38 |
| 2014/0286635 A1* | 9/2014 | Kaneko | H04J 14/0221 398/34 |
| 2015/0117858 A1* | 4/2015 | Al Sayeed | H04B 10/07955 398/38 |
| 2015/0244493 A1 | 8/2015 | Cugini et al. | |
| 2016/0164597 A1* | 6/2016 | Evans | H04J 14/0221 398/9 |

FOREIGN PATENT DOCUMENTS

| | | |
|---|---|---|
| CN | 102292667 A | 12/2011 |
| CN | 103959859 A | 7/2014 |
| CN | 104205692 A | 12/2014 |

OTHER PUBLICATIONS

The International Searching Authority, Notification of Transmittal of the International Search Report and the Written Opinion of the International Searching Authority dated Aug. 31, 2018 in International Application No. PCT/CN2018/088998.

* cited by examiner

METHOD AND APPARATUS FOR MODIFYING CHANNELS IN AN OPTICAL MEDIUM

BACKGROUND

Information can be transmitted over an optical medium such as an optical fiber or other type of optical medium. The information transmitted through an optical medium may be carried in one or more channels. Each channel may represent a separate flow of information between two points. In some examples, each channel may occupy a different portion of the optical spectrum carried by the medium.

SUMMARY

According to an aspect of the present disclosure, there is provided an optical node including transition logic configured to: receive an indication of a data channel to be added across an optical medium, the data channel to occupy a portion of an optical spectrum; in response to a receipt of the indication, divide the data channel into a plurality of sub-channels; and sequentially add each of the plurality of sub-channels across the optical medium in a particular order.

According to another aspect of the present disclosure, there is provided a method that includes receiving, by an optical node, an indication of a data channel to be added across an optical medium; responsive to a receipt of the indication, dividing, by the optical node, the data channel into a plurality of sub-channels; determining, by the optical node, a sequential order in which to add the plurality of sub-channels; and adding, by the optical node, the plurality of sub-channels according to the sequential order.

According to a further aspect of the present disclosure, there is provided a non-transitory machine-readable storage medium storing instructions that upon execution cause a processor to receive an indication of a new data channel to be added by an optical node; in response to a receipt of the indication, divide the data channel into a plurality of sub-channels; and add the plurality of sub-channels across the optical medium in a sequential order.

Optionally, in any of the preceding aspects, some implementations may include sequentially removing each of the sub-channels across the optical medium in a second order.

Optionally, in any of the preceding aspects, some implementations may include determining a count of the plurality of sub-channels based on an available margin of power perturbation.

Optionally, in any of the preceding aspects, some implementations may include determining a count of the plurality of sub-channels based on a bandwidth size of the data channel.

Optionally, in any of the preceding aspects, some implementations may include determining the order based on an increasing perturbation impact of the plurality of sub-channels.

Optionally, in any of the preceding aspects, some implementations may include determining the order based on an increasing wavelength of the plurality of sub-channels.

Optionally, in any of the preceding aspects, some implementations may include determining a ramp rate for at least one sub-channel of the plurality of sub-channels, and ramping transmission of the at least one sub-channel using the determined ramp rate.

Optionally, in any of the preceding aspects, some implementations may include determining the ramp rate based on a maximum allowed perturbation level.

Optionally, in any of the preceding aspects, some implementations may include a variable power combiner.

Optionally, in any of the preceding aspects, some implementations may include sequentially replacing a plurality of dummy channels by the plurality of sub-channels according to the order.

Optionally, in any of the preceding aspects, some implementations may include an optical node that is a reconfigurable optical add-drop multiplexer (ROADM).

BRIEF DESCRIPTION OF THE DRAWINGS

Some implementations of the present disclosure are described with respect to the following figures.

Figure 1:
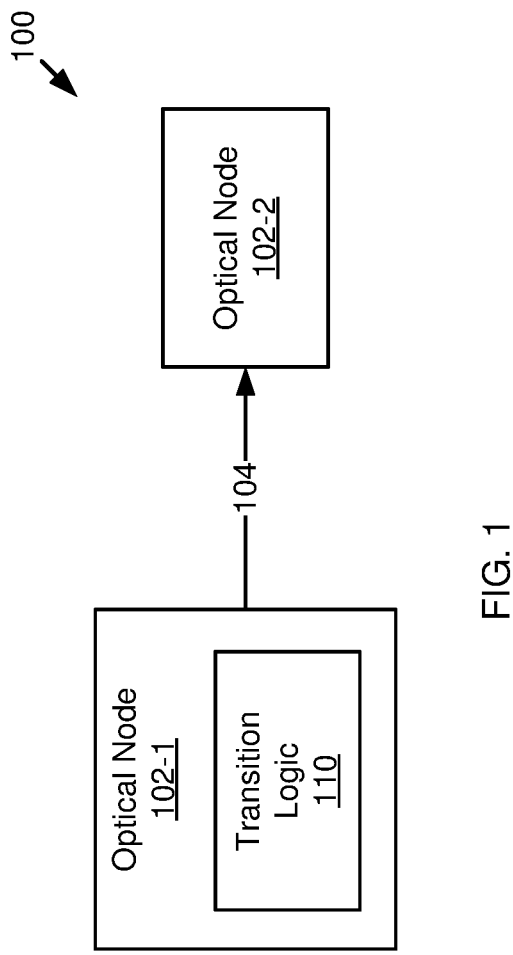
FIG. 1 is a block diagram of an example optical network according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An optical network can include multiple spans of optical media. An optical medium span can refer to a segment of an optical medium terminated at both ends with devices that add, subtract, filter, route, or otherwise process an optical signal. An optical medium span may include capacity for multiple channels, where each channel occupies a different portion of an optical spectrum. In some examples, it may be desirable to add a new channel across an optical medium span, or to remove an existing channel across the optical medium span. However, such channel modifications may cause a power perturbation in the optical medium. In particular, a power perturbation may be severe when caused by adding or removing a channel that occupies a relatively larger portion of spectrum than a standard channel (e.g., more than 50 GHz). Such relatively larger channels may be referred to herein as "superchannels."

In accordance with some implementations of the present disclosure, techniques or systems are provided for reducing the power perturbation resulting from channel modifications. FIG. 1 shows a portion of an example optical network 100, which includes optical nodes 102-1 and 102-2 interconnected by an optical medium span 104. An optical node can refer to any device (or collection of devices) used to apply some form of processing on an optical signal, such as adding an optical signal (for example, a wavelength channel), subtracting an optical signal (for example, a wavelength channel), switching an optical signal between different paths, amplifying an optical signal, propagating an optical signal, and so forth. In some examples, an optical node may be a reconfigurable optical add-drop multiplexer (ROADM).

As shown in FIG. 1, the optical node 102-1 may include transition logic 110 to perform channel modifications (e.g., adding or removing channels across the optical medium span 104). The transition logic 110 may be implemented in hardware, machine-readable instructions (e.g., software and/or firmware), or a combination thereof. For example, the transition logic 110 may be implemented as a controller, a circuit, a processor executing program instructions, a field-programmable gate array (FPGA), and so forth.

In some implementations, the transition logic 110 may use one or more transition strategies to reduce the power perturbation resulting from a channel modification. For example, the transition logic 110 may use spectrum-based transitions, power-based transitions, and/or a combination thereof. In some implementations, a spectrum-based transition may include dividing a data channel into multiple sub-channels. Each sub-channel may occupy a different portion of a spectrum carried by an optical medium. In some examples, a spectrum-based transition may include initiating transmission in each sub-channel in a sequential order (i.e., one sub-channel at a time). Further, in other examples, a spectrum-based transition may include stopping transmission in each sub-channel in a sequential order.

In some implementations, a power-based transition may include determining a ramp rate for a data channel. In some examples, a power-based transition may include ramping up transmission of the data channel based on the ramp rate. Further, in other examples, a power-based transition may include ramping down transmission of the data channel based on the ramp rate. In some implementations, spectrum-based transitions and/or power-based transition may provide gradual transitions to/from the full power of data channels, and may thereby reduce or eliminate power perturbations associated with channel modifications. Examples of spectrum-based and power-based transitions are described further below with reference to FIGS. 2-10 in accordance to various implementations.

Figure 2:
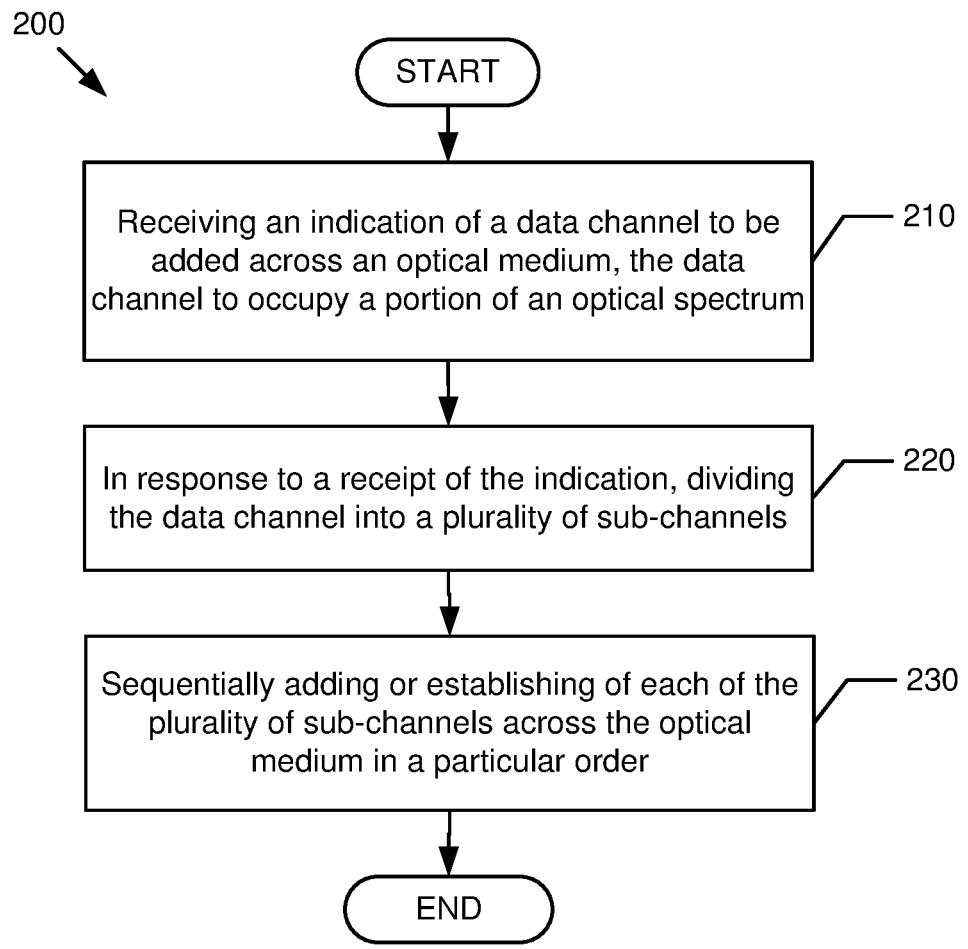
FIG. 2 is a flow diagram of a process for a spectrum-based transition according to some implementations.

Referring now to FIG. 2, shown is an example process 200 for a spectrum-based transition, in accordance with some implementations. Specifically, the process 200 may provide a spectrum-based transition to add a new channel for transmission across a medium. In some examples, the process 200 may be performed by the transition logic 110 shown in FIG. 1. The process 200 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 200 may be described below with reference to FIGS. 1 and 3A-3F, which show examples in accordance with some implementations. However, other implementations are also possible.

Figure 3A:
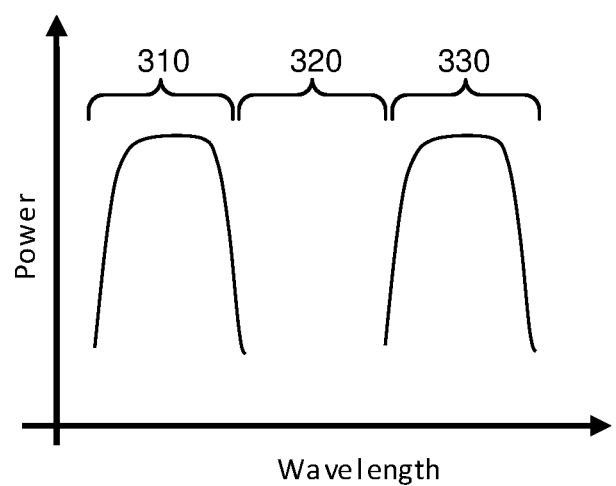
FIGS. 3A-3F are illustrations of an example optical spectrum during a spectrum-based transition according to some implementations.
Figure 3B:
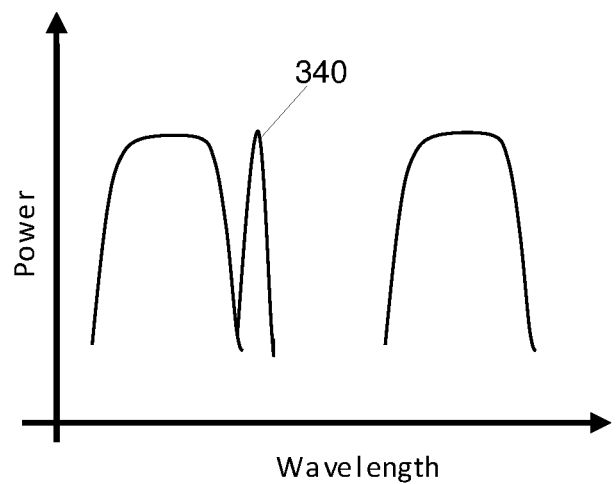
Figure 3C:
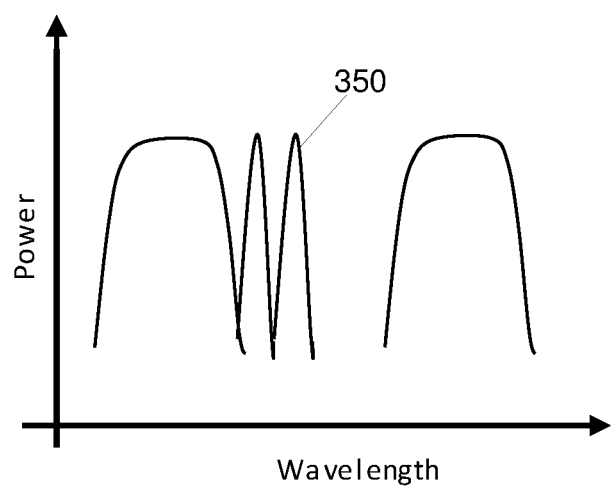
Figure 3D:
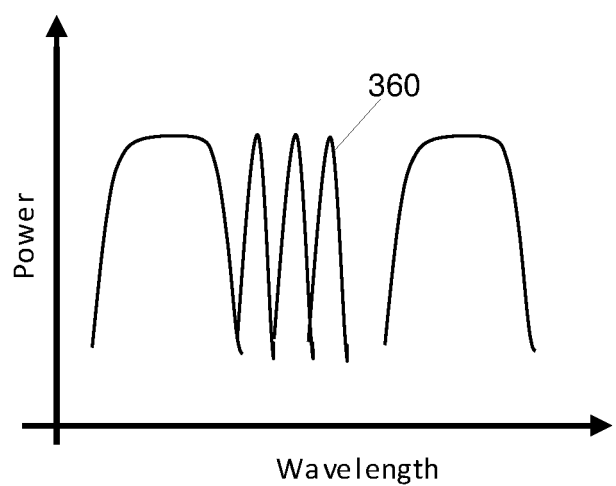
Figure 3E:
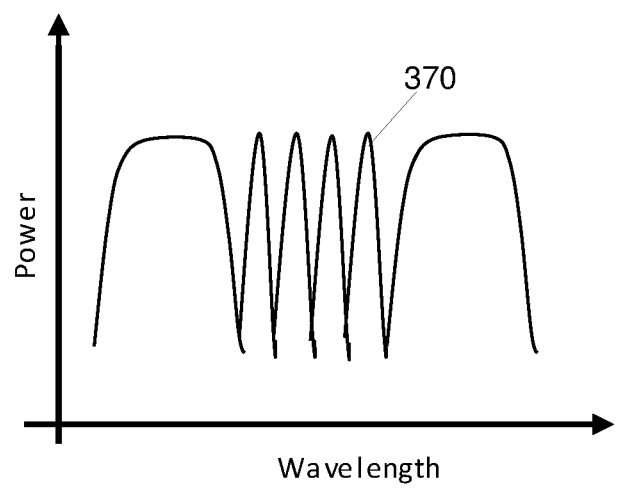

Block 210 may include receiving an indication of a data channel to be added across an optical medium, the data channel to occupy a portion of optical spectrum. For example, referring to FIG. 1, the transition logic 110 may receive an indication of a new channel that is to be added from optical node 102-1 to optical node 102-2 across the optical medium span 104. Further, referring to FIG. 3A, the new channel may be specified to occupy an available portion 320 of an optical spectrum of the medium. As shown, the optical spectrum of the medium may already include existing channels in occupied portions 310 and 330. Note that FIG. 3A shows the available portion 320 as not including any transmitted data prior to initiating a new channel. However, other implementations are possible. For example, in some implementations, the available portion 320 may include a number of placeholder channels or "dummy channels" (not shown in FIG. 3A) that may not include actual data. Such dummy channels may maintain a power load in the available portion 320 while it is unused for transmitting data.

Block 220 may optionally include, in response to a receipt of the indication, dividing the data channel into a plurality of sub-channels. For example, referring to FIG. 1, the transition logic 110 may divide the new channel into N sub-channels. In some implementations, the transition logic 110 may, alternatively or as part of the division, determine a count of the sub-channels (i.e., N sub-channels) using any number of parameters and/or techniques. For example, some parameters used to determine the number N of sub-channels may include an available margin of power perturbation (e.g., a power perturbation tolerance of an optical node), signal spectral profiles of optical nodes (e.g., power profile, bandwidth profile, etc.), a power offset or surge expected to be experienced by other channels in the medium, an estimated power load of the channel when fully activated, a number of hops (e.g., a number of nodes) in a length of the optical medium, a number of amplifiers in a length of the optical medium, and so forth. In some implementations, the N sub-channels may be of uniform size (e.g., a uniform bandwidth of 20 GHz). In other implementations, the N sub-channels may have non-uniform sizes (e.g., bandwidths of 1 GHz, 10 GHz, 20 GHz, and so forth). In some implementations using non-uniform sizes of sub-channels, the size of each sub-channel may be selected or determined to minimize the power perturbation in the optical medium (e.g., relative larger sizes for sub-channels that result in the least power perturbation when established, and relative smaller sizes for sub-channels that result in the most power perturbation when established).

To illustrate one example of determining the number of sub-channels, assume that a channel with a bandwidth size of 200 GHz is to be added to a section of optical medium. Assume also that this section includes 10 amplifiers, and that each amplifier is known to have a power offset of 0.5 decibel (dB) with the addition of a 50 GHz channel (e.g., based on historical data, test results, etc.). Finally, assume that this section has an available margin of power perturbation of 1 dB. Accordingly, in this example, the transition logic 110 may multiply a ratio of channel sizes (i.e., 200 MHz/50 Mhz=4) by the expected offset (i.e., 0.5 dB/amplifier×10 amplifiers=5 dB) to obtain a total offset of 20 dB. Further, the transition logic 110 may divide the total offset by the available margin to obtain a minimum number of sub-channels (i.e., 20 dB/1 dB=20 sub-channels). Thus, in this example, the transition logic 110 may determine the number N of sub-channels to be equal to or greater than 20 (i.e., the minimum number of sub-channels). Note that this example is not intended to be limiting, and it is contemplated that other parameters and/or techniques for calculating the number N of sub-channels may be used.

Block 230 may include sequentially adding or establishing of each of the plurality of sub-channels across the optical medium in a particular order. For example, referring to FIG. 1, the transition logic 110 may determine an initiation order for the N sub-channels. The transition logic 110 may also cause the N sub-channels to be established according to the determined order. By way of illustration, FIG. 3B-3E show a sequence of sub-channels 340, 350, 360, 370 established in a portion of spectrum to be occupied by the data channel (i.e., in portion 320 shown in FIG. 3A). Further, referring to FIG. 3F, the established sub-channels 340, 350, 360, 370 may together form (or be used as) a single channel 380. In some examples, channel 380 may include the bandwidth of multiple standard channels, and may be referred to as a superchannel.

In some implementations, the transition logic 110 may determine an order for initiating the establishment of sub-channels using any number of strategies and/or parameters. For example, the sub-channels may be established according to an order of increasing perturbation impact (e.g., from the sub-channel that results in the least power perturbation when established to the sub-channel that results in the most power perturbation when established). In another example, the sub-channels may be established in an increasing wavelength order (e.g., from the sub-channel including a shortest wavelength to the subchannel including a longest wavelength). In yet another example, the sub-channels may be established in a decreasing wavelength order. In still another example, the sub-channels may be established in a random order. Note that these examples are not intended to be limiting, and it is contemplated that other ordering strategies and/or parameters may be used. After block 230, the process 200 is completed.

In some implementations, the new data channel may replace a number of dummy channels (not shown in FIGS. 3A-3F). In such implementations, the dummy channels may be sequentially replaced by the sub-channels according to the determined order of establishment. For example, as each sub-channel is established in order, it may replace a single dummy channel in a corresponding portion of an optical spectrum.

Figure 3F:
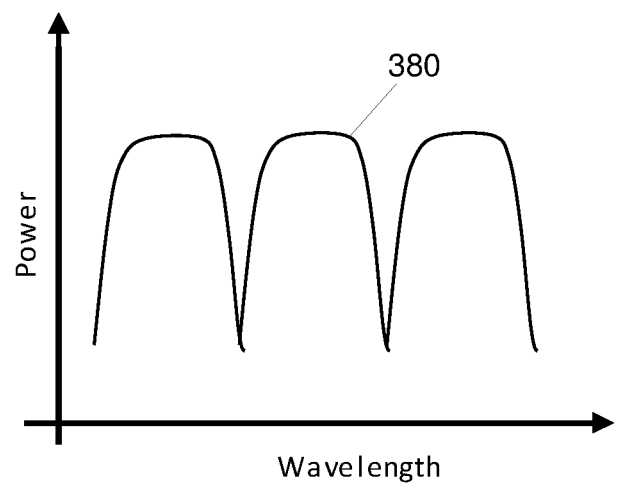
Figure 4:
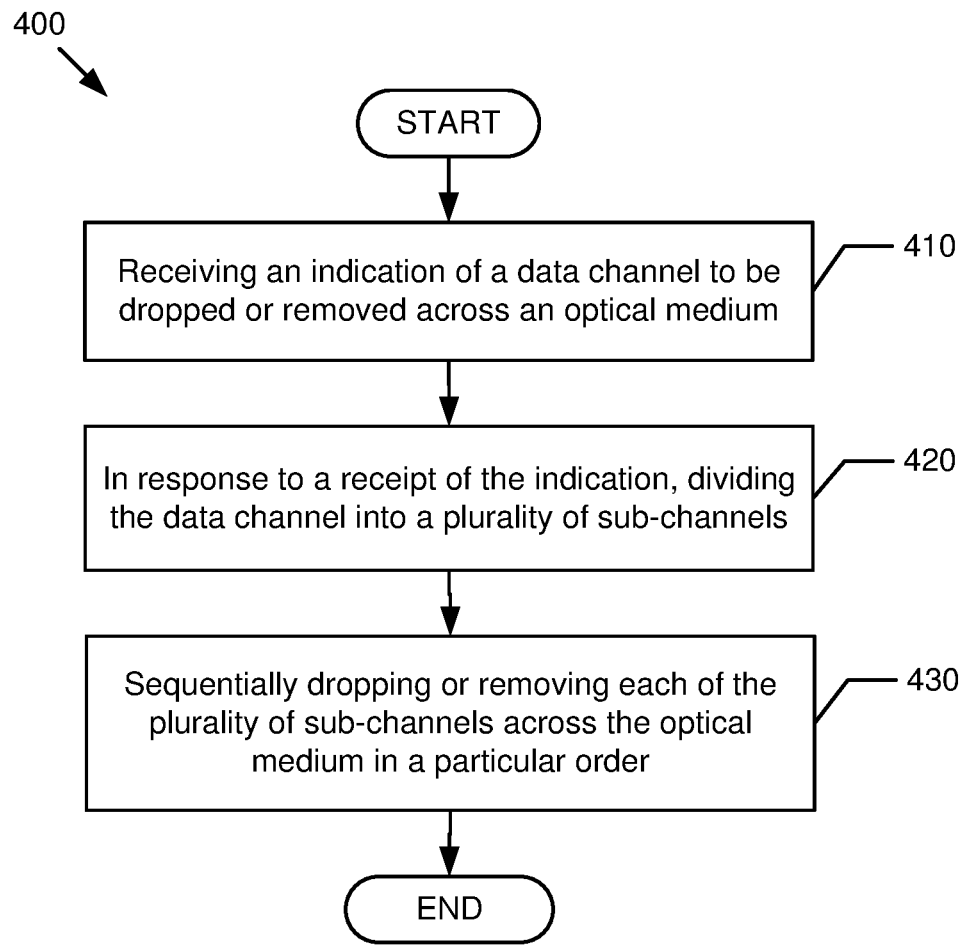
FIG. 4 is a flow diagram of a process for a spectrum-based transition according to some implementations.

Referring now to FIG. 4, shown is an example process 400 for a spectrum-based transition, in accordance with some implementations. Specifically, the process 400 may provide a spectrum-based transition to remove a channel from transmission across a medium. In some examples, the process 400 may be performed by the transition logic 110 shown in FIG. 1. The process 400 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 400 may be described below with reference to FIGS. 1 and 3A-3F, which show examples in accordance with some implementations. However, other implementations are also possible.

Block 410 may include receiving an indication of a data channel to be dropped or removed across an optical medium. For example, referring to FIG. 1, the transition logic 110 may receive an indication of a channel that is to be removed across the optical medium span 104. Referring to FIG. 3F, the channel to be removed may be the channel 380.

Block 420 may optionally include, in response to a receipt of the indication, dividing the data channel into a plurality of sub-channels. In some implementations, for example, referring to FIG. 1, the transition logic 110 may, alternatively or as part of the division, determine a count of the sub-channels (i.e., N sub-channels) using similar parameters and/or techniques to those described above with reference to block 220 of FIG. 2 (e.g., an available margin of power perturbation, signal spectral profiles, expected power offsets, estimated power load, number of hops, number of amplifiers, etc.).

Block 430 may include sequentially dropping or removing each of the plurality of sub-channels across the optical medium in a particular order. For example, referring to FIG. 1, the transition logic 110 may determine an order for the N sub-channels, and may drop or cause the N sub-channels to stop transmitting in the sub-channels according to the determined order. In some implementations, the dropping or removal of the sub-channels may be determined as the reverse of the establishment order described above with reference to block 230 of FIG. 2. After block 430, the process 400 is completed.

Figure 5:
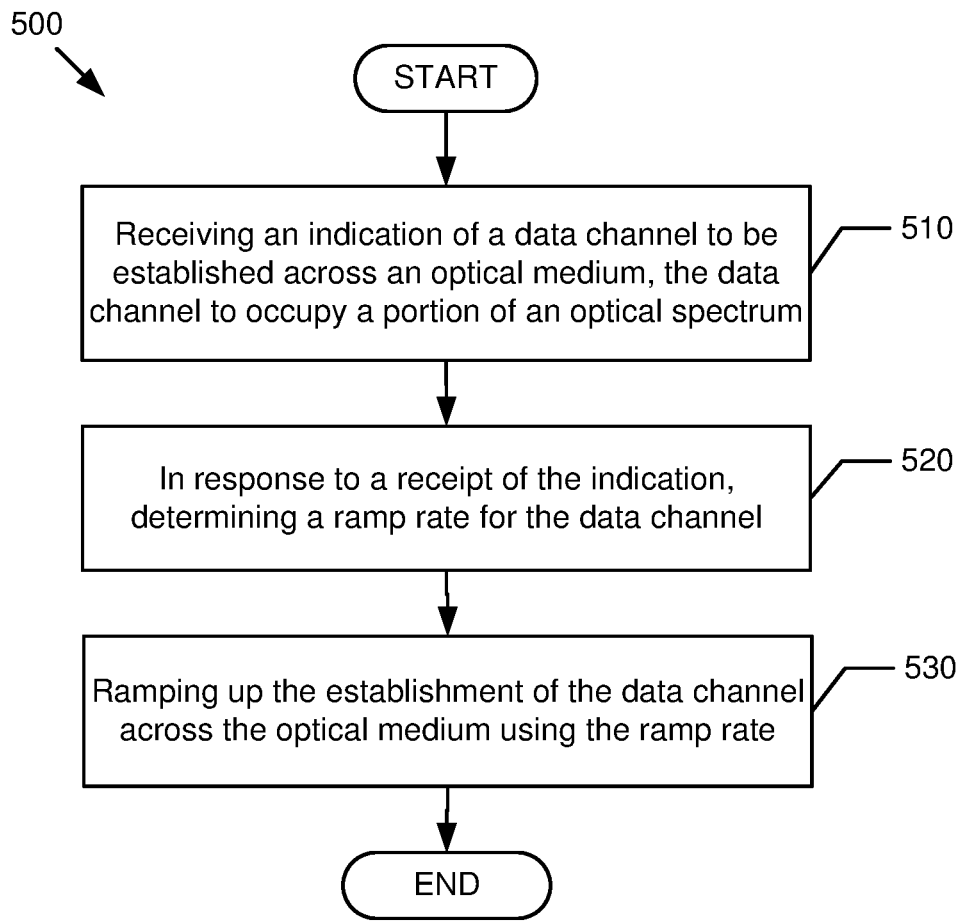
FIG. 5 is a flow diagram of a process for a power-based transition according to some implementations.

Referring now to FIG. 5, shown is an example process 500 for a power-based transition, in accordance with some implementations. Specifically, the process 500 may provide a power-based transition to add a new data channel across a medium. In some examples, the process 500 may be performed by the transition logic 110 shown in FIG. 1. The process 500 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 500 may be described below with reference to FIGS. 1 and 6A-6D, which show examples in accordance with some implementations. However, other implementations are also possible.

Block 510 may include receiving an indication of a data channel to be established across an optical medium, the data channel to occupy a portion of optical spectrum. For example, referring to FIG. 1, the transition logic 110 may receive an indication of a new channel that is to be established from optical node 102-1 to optical node 102-2 across the optical medium span 104. Further, referring to FIG. 6A, the new channel may occupy a portion 620 of an optical spectrum of the medium. As shown, the optical spectrum of the medium may already include existing channels in portions 610 and 630.

Block 520 may include, in response to a receipt of the indication, determining a ramp rate for the data channel. For example, referring to FIG. 1, the transition logic 110 may determine a rate and/or a number of iterations to increase the power level of the data channel using any number of parameters and/or techniques (e.g., an available margin of power perturbation, signal spectral profiles, expected power offsets, estimated power load, number of hops, number of amplifiers, etc.). The ramp rate may be defined in terms of power level change per unit of time. Further, the ramp rate may be defined as being performed in a series of iterations or steps between start and finish. In some implementations, the transition logic 110 may determine the ramp rate such that a power perturbation level in the optical system is maintained below a maximum allowed perturbation level while the new channel is being added.

Figure 6A:
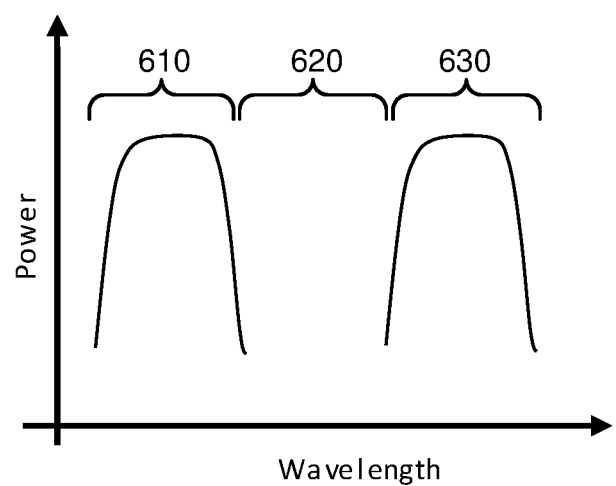
FIGS. 6A-6D of an example optical spectrum during a power-based transition according to some implementations.
Figure 6B:
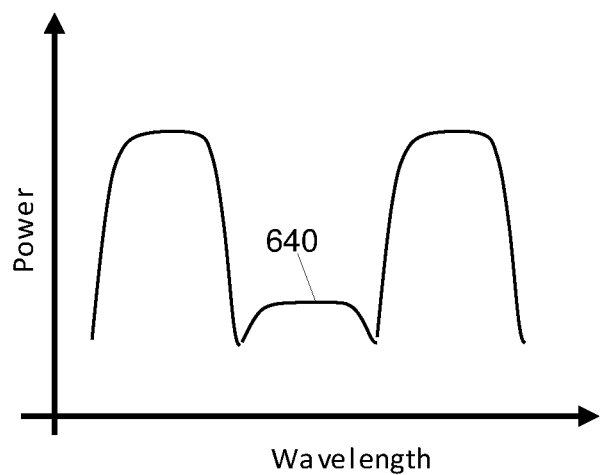
Figure 6C:
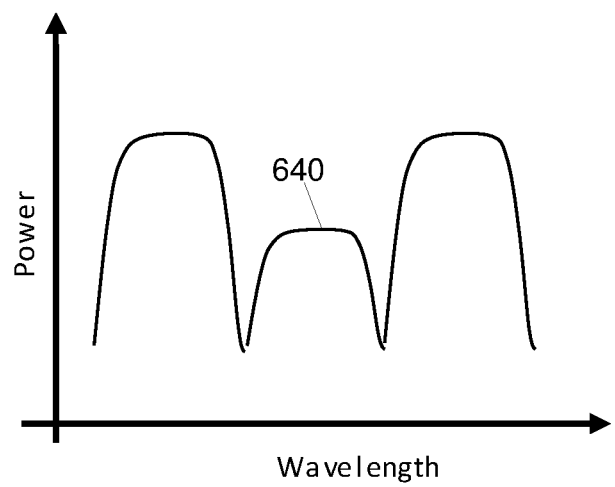

Block 530 may include ramping up the establishment of the data channel using the determined ramp rate. For example, referring to FIG. 1, the transition logic 110 may cause the transmission power level of a new channel to be ramped up according to the determined ramp rate. By way of illustration, FIGS. 6B and 6C show iterations in which a transmission of channel 640 is gradually increased in power, until reaching a full power level in FIG. 6D. After block 530, the process 500 is completed.

Figure 7A:
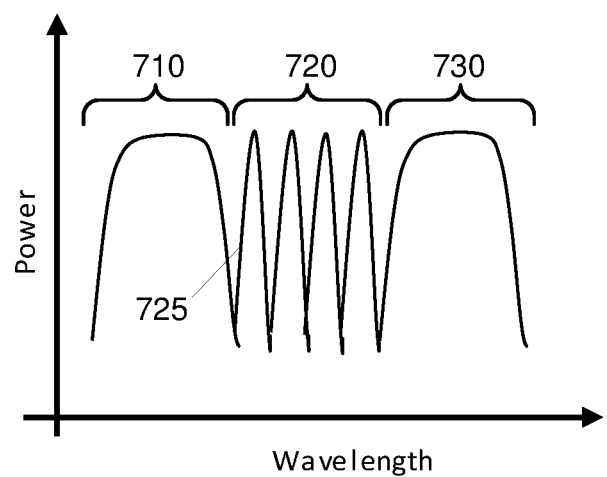
FIGS. 7A-7D of an example optical spectrum during a power-based transition according to some implementations.
Figure 7B:
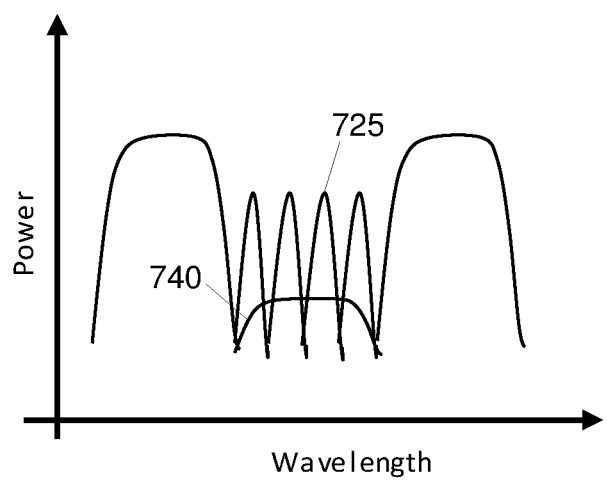
Figure 7C:
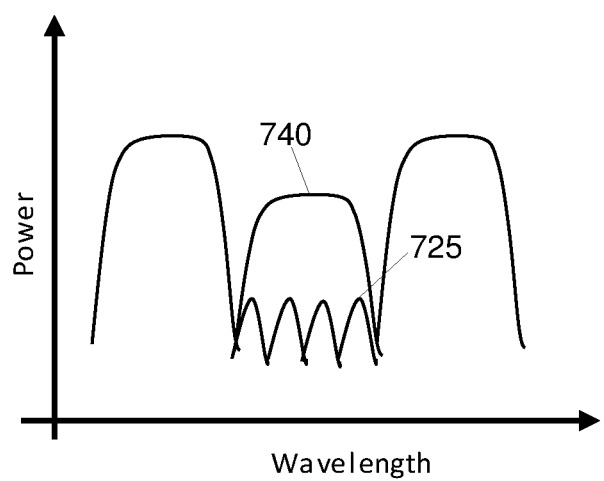
Figure 7D:
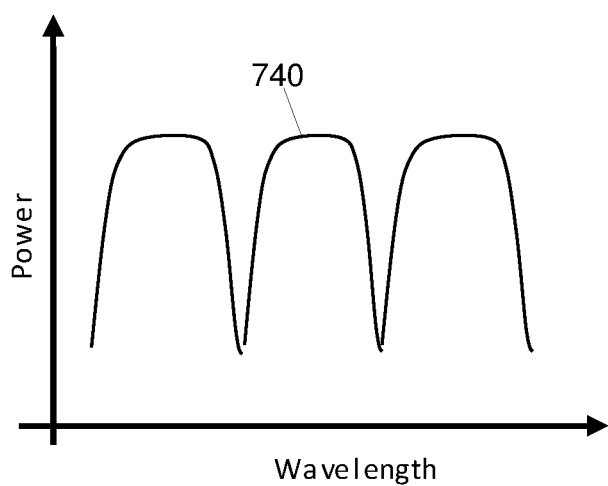

In some implementations, the new data channel (established by process 500) may replace a number of dummy channels. In such implementations, the power level of the dummy channels may be ramped down as the power level of the new data channel is ramped up. Referring now to FIGS. 7A-7D, shown is an example of a power-based transition with dummy channels. As shown in FIG. 7A, prior to ramping the new data channel, the available portion 720 may include a number of dummy channels 725. Further, FIGS. 7B-7C illustrate that, as the power level of new channel 740 is ramped up, the power level of the dummy channels 725 is ramped down. In some implementations, the combined power level of the new channel and the dummy channels 725 may be maintained at a constant level (e.g., the original power level of the dummy channels 725 shown in FIG. 7A) during the ramp process. Finally, as shown in FIG. 7D, the dummy channels 725 are no longer present once the new channel 740 is fully ramped up.

Figure 8:
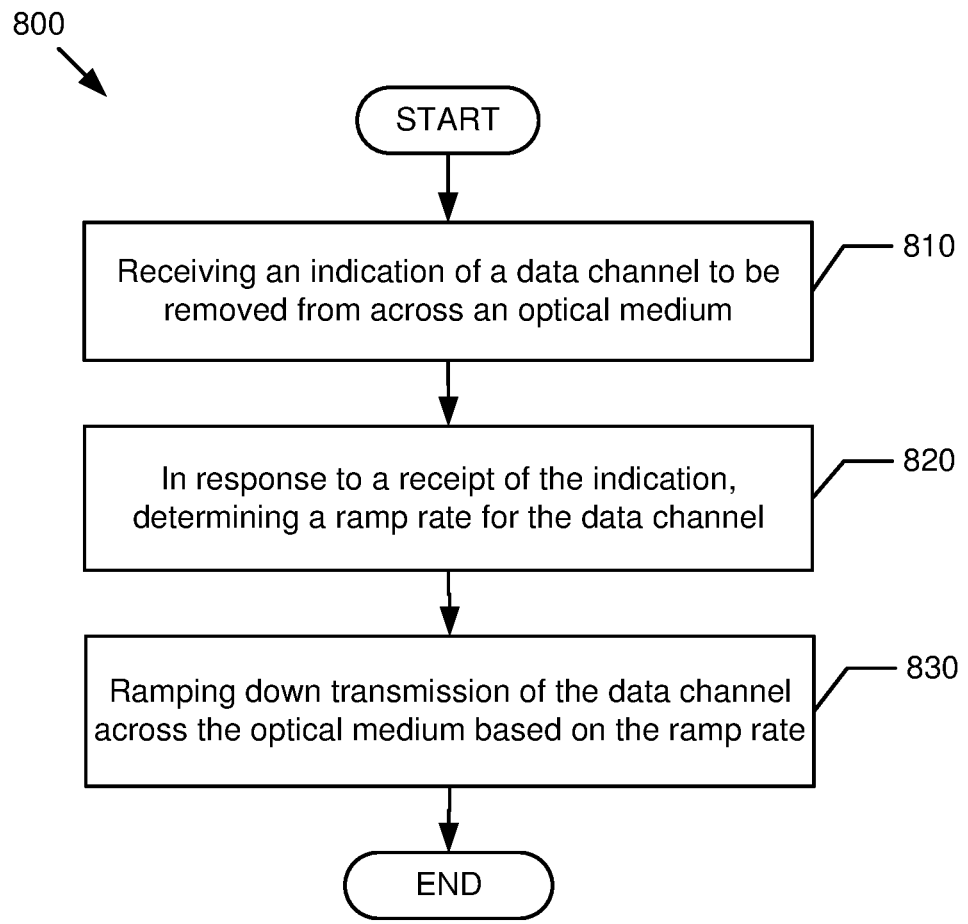
FIG. 8 is a flow diagram of a process for a power-based transition according to some implementations.

Referring now to FIG. 8, shown is an example process 800 for a power-based transition, in accordance with some implementations. Specifically, the process 800 may provide a power-based transition to remove a channel from across a medium. In some examples, the process 800 may be performed by the transition logic 110 shown in FIG. 1. The process 800 may be implemented in hardware or machine-readable instructions (e.g., software and/or firmware). The machine-readable instructions are stored in a non-transitory computer readable medium, such as an optical, semiconductor, or magnetic storage device. For the sake of illustration, details of the process 800 may be described below with reference to FIGS. 1 and 6A-6D, which show examples in accordance with some implementations. However, other implementations are also possible.

Figure 6D:
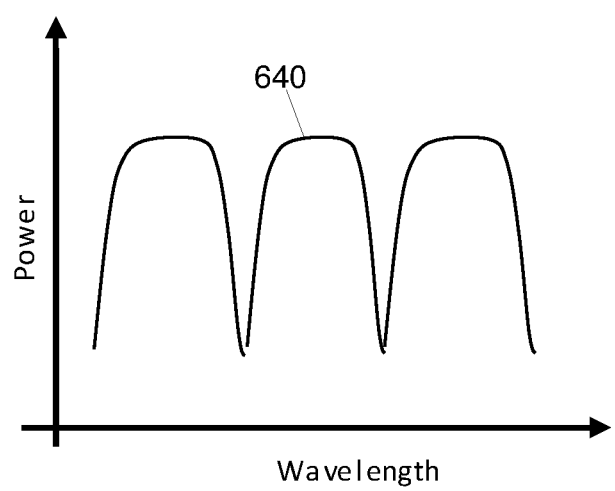

Block 810 may include receiving an indication of a data channel to be removed from across an optical medium. For example, referring to FIG. 1, the transition logic 110 may receive an indication of an existing channel that is to be removed from transmission across the optical medium span 104. Referring to FIG. 6D, the channel to be removed may be the channel 640.

Block 820 may include, in response to a receipt of the indication, determining a ramp rate for the data channel. For example, referring to FIG. 1, the transition logic 110 may determine a rate and/or number of iterations to decrease the power level of the data channel using similar parameters and/or techniques to those described above with reference to block 420 of FIG. 4 (e.g., an available margin of power perturbation, signal spectral profiles, expected power offsets, estimated power load, number of hops, number of amplifiers, etc.).

Block 830 may include ramping down transmission of the data channel using the determined ramp rate. For example, referring to FIG. 1, the transition logic 110 may cause the transmission power level of the existing channel to be ramped down according to the determined ramp rate. In some implementations, as the power level of the existing data channel is ramped down, the power level of a set of dummy channels occupying the same portion of optical spectrum may be ramped up. After block 830, the process 800 is completed.

Figure 9:
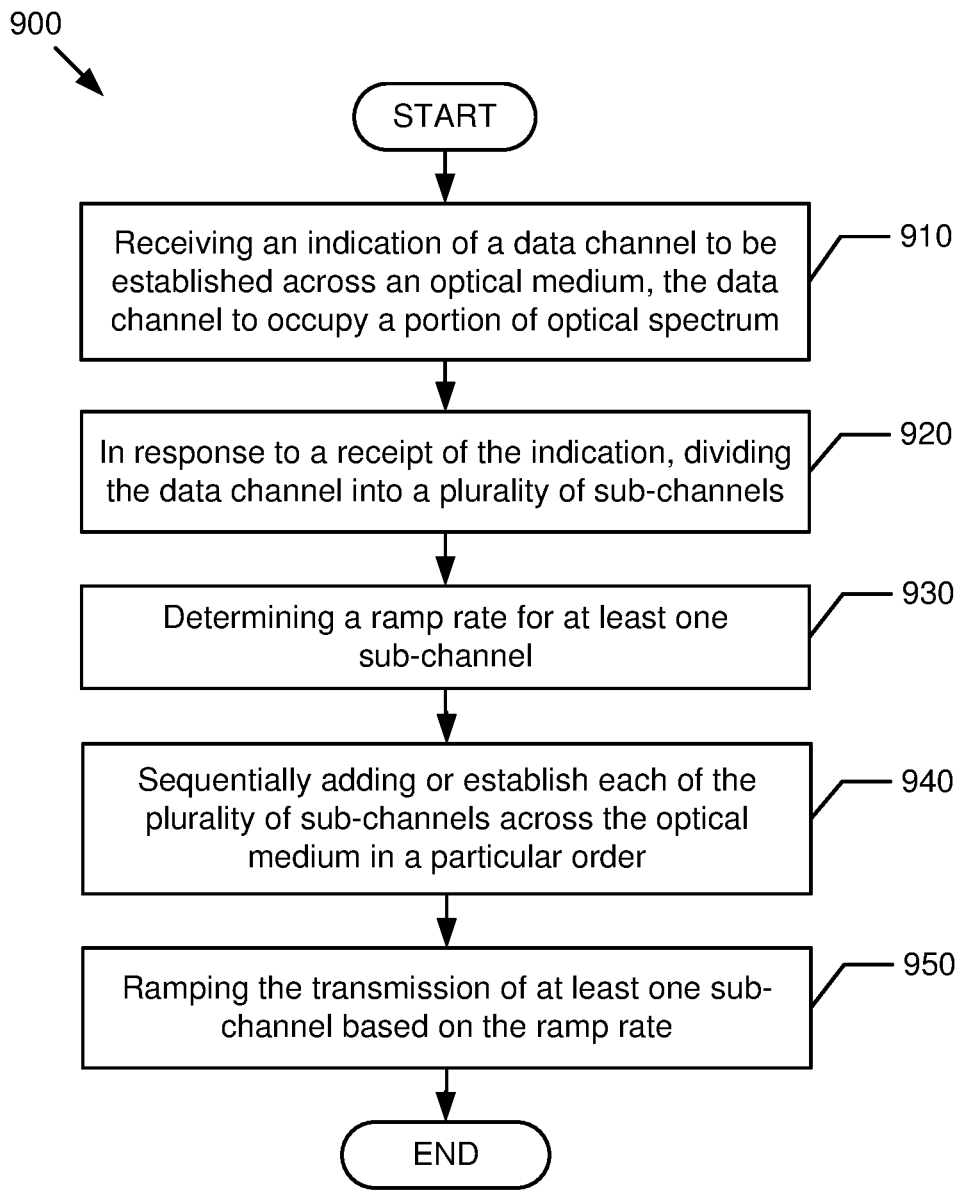
FIG. 9 is a flow diagram of a process for a hybrid transition according to some implementations.

Referring now to FIG. 9, shown is an example process 900 for process for a hybrid transition, in accordance with some implementations. Specifically, the process 900 may provide a combination of spectrum-based and power-based transitions to add a new channel across a medium. In some examples, the process 900 may be performed by the transition logic 110 shown in FIG. 1. The process 900 may be implemented in hardware or machine-readable instructions (e.g., software and/or firmware). The machine-readable instructions are stored in a non-transitory computer readable medium, such as an optical, semiconductor, or magnetic storage device.

Block 910 may include receiving an indication of a data channel to be established across an optical medium, the data channel to occupy a portion of optical spectrum. For example, referring to FIG. 1, the transition logic 110 may receive an indication of a new channel that is to be transmitted from optical node 102-1 to optical node 102-2 across the optical medium span 104.

Block 920 may optionally include, in response to a receipt of the indication, dividing the data channel into a plurality of sub-channels. In some implementations, for example, referring to FIG. 1, the transition logic 110 may, alternatively or as part of the division, determine a count of the sub-channels (i.e., N sub-channels) using similar parameters and/or techniques to those described above with reference to block 220 of FIG. 2 (e.g., an available margin of power perturbation, signal spectral profiles, expected power offsets, estimated power load, number of hops, number of amplifiers, etc.).

Block 930 may include determining a ramp rate for at least one of the N sub-channels. For example, referring to FIG. 1, the transition logic 110 may determine a rate and/or a number of iterations to increase the power level of a set of sub-channels using any number of parameters and/or techniques (e.g., an available margin of power perturbation, signal spectral profiles, expected power offsets, estimated power load, number of hops, number of amplifiers, etc.). In some implementations, the transition logic 110 may determine the ramp rate such that a power perturbation level in the optical system is maintained below a maximum allowed perturbation level.

Block 940 may include sequentially adding or establishing each of the plurality of sub-channels across the optical medium in a particular order. For example, referring to FIG. 1, the transition logic 110 may determine an order for the N sub-channels, and may cause the establishment of the N sub-channels according to the determined order. In some implementations, this order may be determined in a similar manner to that described above with reference to block 230 of FIG. 2.

Block 950 may include ramping up transmission of at least one sub-channel using the ramp rate (determined at block 930). For example, referring to FIG. 1, the transition logic 110 may cause the transmission power level of established sub-channels (i.e., a sub-channel established at block 940) to be ramped up according to the determined ramp rate. In some examples, as each sub-channel is established in a sequential order, that sub-channel is individually ramped up according to the determined ramp rate. After block 950, the process 900 is completed.

Figure 10:
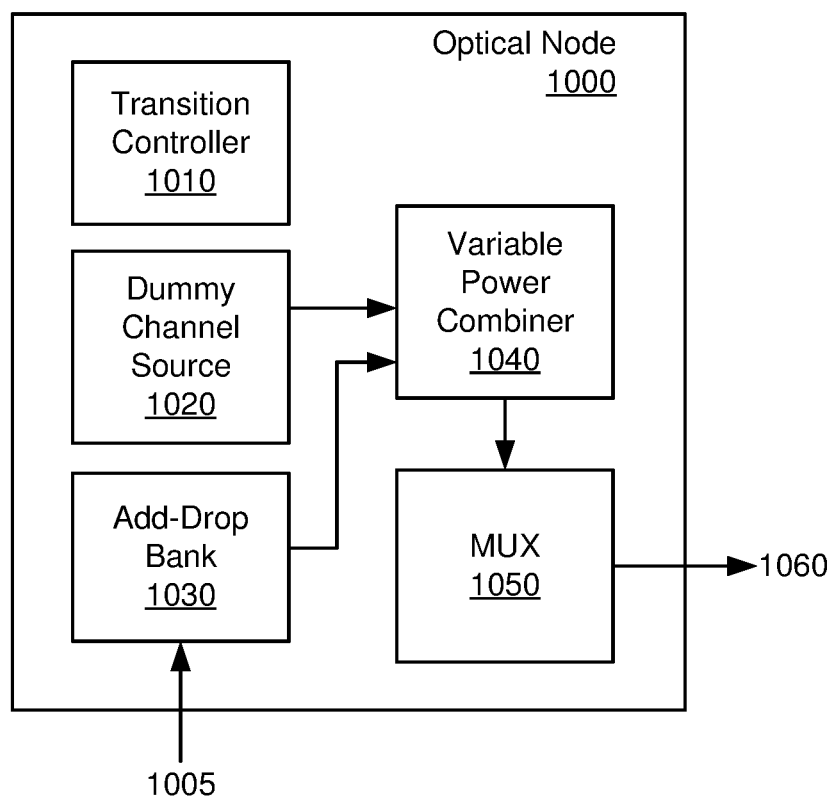
FIG. 10 is a block diagram of an example optical node according to some implementations.

Referring now to FIG. 10, shown is an example optical node 1000, in accordance with some implementations. The optical node 1000 may be a hardware device (or collection of devices) used to apply some form of processing on an optical signal. In some examples, the optical node 1000 may be a reconfigurable optical add-drop multiplexer (ROADM).

As shown, the optical node 1000 may include a transition controller 1010, a dummy channel source 1020, an add-drop bank 1030, a variable power combiner 1040, and a multiplexer (MUX) 1050. The transition controller 1010 may correspond generally to an example embodiment of some or all of the transition logic 100 shown in FIG. 1. For example, the transition controller 110 may be a hardware controller, a circuit, a hardware processor executing program instructions, and so forth.

In some implementations, the dummy channel source 1020 may provide dummy channels (e.g., placeholder channels that do not include actual data). The add-drop bank 1030 may add a data channel 1005 to be transmitted by the optical node 1000. In some implementations, the variable power combiner 1040 can combine the dummy channels (from the dummy channel source 1020) and the data channel 1005 at various power levels. The variable power combiner 1040 may provide a combined channel to the MUX 1050 to be transmitted as an output channel 1060. In some examples, the variable power combiner 1040 may be based on a Mach-Zehnder interferometer.

In some examples, the transition controller 1010 may control the variable power combiner 1040 to ramp up the power level of the data channel 1005. Further, the transition controller 1010 may optionally control the variable power combiner 1040 to ramp down the power levels of the dummy channels. Thus, in some implementations, the optical node 1000 may provide a power-based transition to add a new data channel across an optical medium.

Furthermore, in some examples, the transition controller 1010 may control the variable power combiner 1040 to ramp down the power level of the data channel 1005, and to optionally ramp up the power levels of the dummy channels. Thus, in some implementations, the optical node 1000 may provide a power-based transition to remove an existing channel from data transmitted by an optical medium.

As noted above, in some examples, the transition logic 100 shown in FIG. 1 can be implemented at least in part by machine-readable instructions, which can be executable on a hardware processing circuit. The machine-readable instructions can be stored in a non-transitory machine-readable or computer-readable storage medium, which can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

As discussed above, some implementations may provide spectrum-based transitions and/or power-based transitions for adding and/or removing data channels from an optical medium. Specifically, spectrum-based transition may divide a channel into multiple sub-channels, and may sequentially add or remove the sub-channels in a particular order. Further, power-based transitions may include determining a ramp rate used to ramp transmission of a data channel. Thus, in some implementations, spectrum-based transitions and/or power-based transition may provide gradual transitions to/from the full power of data channels, and may thereby reduce or eliminate power perturbations associated with channel modifications.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An optical node comprising:
  transition logic configured to:
    receive an indication of a data channel to be added across an optical medium, the data channel to occupy a portion of an optical spectrum;
    in response to a receipt of the indication, divide the data channel into a plurality of sub-channels;
    determine a particular order of the plurality of sub-channels based on an increasing perturbation impact of the plurality of sub-channels; and
    sequentially add each of the plurality of sub-channels across the optical medium in the determined particular order,
    wherein the transition logic is configured to determine a count of the plurality of sub-channels based on an available margin of power perturbation.

2. A method comprising:
  receiving, by an optical node, an indication of a data channel to be added across an optical medium;
  responsive to a receipt of the indication, dividing, by the optical node, the data channel into a plurality of sub-channels;
  determining, by the optical node, a sequential order in which to add the plurality of sub-channels based on an order of increasing perturbation impact of the plurality of sub-channels;
  adding, by the optical node, the plurality of sub-channels according to the sequential order;
  determining a first bandwidth size of the data channel to be added;
  determining an expected power offset in an amplifier for an addition of a channel of a second bandwidth size;
  determining a ratio of the first bandwidth size divided by the second bandwidth size;
  multiplying the determined ratio by the expected power offset to obtain a total offset;
  dividing the total offset by available margin of power perturbation to obtain a count of the plurality of sub-channels; and
  based on the count, dividing the data channel into the plurality of sub-channels.

3. A non-transitory machine-readable storage medium storing instructions that upon execution cause at least one processor to:
  receive an indication of a new data channel to be added by an optical node across an optical medium;

in response to a receipt of the indication:
  divide the new data channel into a plurality of sub-channels;
  determine a sequential order in which to add the plurality of sub-channels based on an increasing perturbation impact of the plurality of sub-channels; and
  add the plurality of sub-channels across the optical medium in the determined sequential order,
wherein the instructions cause the at least one processor to determine a count of the plurality of sub-channels based on an available margin of power perturbation.

* * * * *